United States Patent
Atkins et al.

(10) Patent No.: US 11,277,543 B1
(45) Date of Patent: Mar. 15, 2022

(54) PERCEPTUAL DITHERING FOR HDR VIDEO AND IMAGES

(71) Applicant: DOLBY LABORATORIES LICENSING CORPORATION, San Francisco, CA (US)

(72) Inventors: Robin Atkins, Vancouver (CA); Jaclyn Anne Pytlarz, Santa Clara, CA (US); Robert Wanat, Sunnyvale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/319,483

(22) Filed: May 13, 2021

(51) Int. Cl.
 *G06T 5/00* (2006.01)
 *H04N 1/60* (2006.01)

(52) U.S. Cl.
 CPC ........... *H04N 1/6005* (2013.01); *G06T 5/009* (2013.01)

(58) Field of Classification Search
 CPC .. G09G 3/2044; G09G 3/2048; G09G 3/2059; G09G 3/2066; G06T 5/007; G06T 5/009; H04N 1/6005
 See application file for complete search history.

(56) References Cited

U.S. PATENT DOCUMENTS

| 9,584,786 B2 | 2/2017 | Atkins | |
| 2011/0091130 A1* | 4/2011 | Faubert | G06T 5/002 |
| | | | 382/275 |

OTHER PUBLICATIONS

Atkins, R. et al. "Perceptually dithered HDR for 8-bit interfaces," SMPTE 2020 Annual technical conference and Exhibition, Nov. 2020, pp. 1-12.
Daly, S. et al. "Decontouring: prevention and removal of false contour artifacts. Proceedings of the SPIE, Human Vision and Electronic Imaging IX," in SPIE, Human Vision 25 and Electronic Imaging IX, Jun. 7, 2004, pp. 130-149.
ITU-R BT. 2100 "Image Parameter Values for High Dynamic Range Television for Use in Production and International Programme Exchange" ITU, Jul. 2016.
ITU-R Recommendation ITU-R BT.1886 "Reference Electro-Optical Transfer Function for Flat Panel Displays Used in HDTV Studio Production" Mar. 2011, pp. 1-7.
SMPTE 2084:2014 "High Dynamic Range Electro-Optical Transfer Function of Mastering Reference Displays" Aug. 16, 2014.

* cited by examiner

*Primary Examiner* — Antonio A Caschera

(57) ABSTRACT

In a method for dithering image data, a processor receives an input image in a first color space and a first bit depth larger than 8 bits. The processor converts the input image into a first image in a perceptually uniform color space, such as the BT. 2100 ICtCp color space, with pixel values scaled to be within a target bit depth, it quantizes the first image to generate a quantized image, it generates an error image between the first image and the quantized image, and using a random threshold, it generates a dithered image based on the random threshold, the error image, and the quantized image, allowing to reduce the bit-depth representation for visually consistent reproduction by two bits.

9 Claims, 2 Drawing Sheets

PERCEPTUAL DITHERING FOR HDR VIDEO AND IMAGES

CROSS-REFERENCE TO RELATED APPLICATIONS

Not Applicable

TECHNOLOGY

The present disclosure relates generally to images. More particularly, an embodiment of the present invention relates to dithering techniques for high dynamic range (HDR) video and images.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). For example, using gamma luminance coding, images where n≤8 (e.g., color 24-bit JPEG images) are considered images of standard dynamic range, while images where n≥10 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m² or nits. Most consumer HDTVs range from 300 to 500 nits with new models reaching 1,000 nits (cd/m²). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

High Dynamic Range (HDR) and Wide Color Gamut (WCG) content is commonly represented using the Perceptual Quantizer (PQ) (Ref. [1]) mapping over 10/12-bit interfaces, which has been determined to be sufficient for the dynamic range and color gamut in use today. However, there remain limitations in older standards and physical interfaces where the content is constrained to an 8-bit representation. One such example is the physical interface over 12G SDI and HDMI v2.0, which have maximum data rates of 12-14 Gbit/s. This imposes limits on the combination of bit-depth, resolution, and frame rate that can be transmitted. At high resolutions and frame rates, 10-bit transmission may not be supported or may require chroma subsampling. A second example is the interface between some embedded graphics processing units (GPUs) and a display panel. Although many modern GPUs use floating point processors, the output of the GPU may be constrained to an 8-bit interface, either because of a memory bandwidth limitation or because of an operating system that does not support higher bit depths. Quantizing an HDR signal to 8 bits at these interfaces can cause visible banding and color errors. As appreciated by the inventors here, improved techniques for quantizing (dithering) HDR signals to lower bit-depths are desired The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
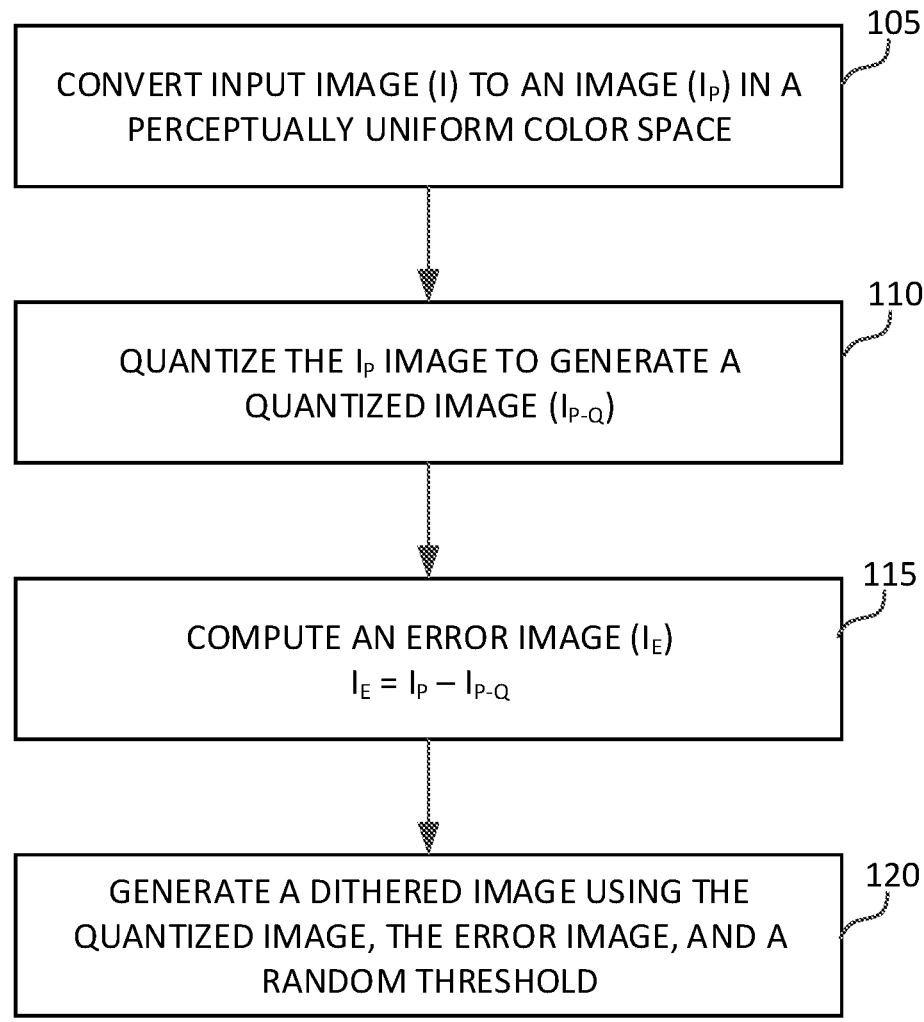
FIG. 1 depicts a perceptual dithering process according to an embodiment.

Methods for perceptual dithering for HDR and SDR video, images, and graphics are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to perceptual dithering of images video, and graphics. In an embodiment, a processor receives an input image in a first color space (e.g., RGB or YCbCr) and a first bit depth higher than 8 bits (e.g., 10 bits or higher). It converts the input image into a first image in a perceptually uniform color space, such as ICtCp, with pixel values scaled to be within a target bit depth lower than the first bit depth (e.g., 8 bits). Next, it quantizes the first image ($I_P$) to generate a quantized image ($I_{P-Q}$), wherein for pixels at position (i,j)

$$I_{P-Q}(i,j)=\text{floor}(I_P(i,j)+0.5).$$

It generates an error image ($I_E$) comprising pixel by pixel differences between pixels in the first image and corresponding pixels in the quantized image. Given a random threshold ($T_h$) in [0, 1], it generates a dithered image ($I_D$) based on the random threshold, the error image, and the quantized image, wherein if $|I_E(i,j)|>T_h$ then $$I_D(i,j)=I_{P-Q}(i,j)+\text{sign}(I_E(i,j)),$$

else $I_D(i,j)=I_{P-Q}(i,j)$.

Example HDR System with Perceptual Dithering

Today, most 8-bit interfaces that predate HDR use gamma encoding as defined in ITU-R. BT.1886 (Ref. [2]). This representation tends to produce greater quantization errors in dark colors than for bright colors, with the magnitude depending on the luminance range and color gamut. By comparison, it is more common for HDR and WCG content to be represented according to ITU-R BT.2100 (Ref. [3]). One option for representing color suggested by BT.2100 is the $IC_TC_P$ (or ICtCp) color space, which is optimized for minimizing distortions across a wide range of luminance levels. At a given bit depth, representing colors using $IC_TC_P$ results in lower peak distortions compared with BT.1886, even when representing a much wider color volume. Despite the improved performance, when quantizing to an 8-bit interface the distortions are above the visible threshold (Ref.[4]).

Previous work (see Ref. [4]) studied the impact of quantization in various color encoding representations and concluded that quantizing using the $IC_TC_P$ color representation results in less visible banding at the same bit depth compared with gamma-encoding. To further reduce the visibility of quantization distortions, dithering has historically been used as a method to hide the effects of quantization at lower bit-depths. It works by re-distributing errors from frequencies where the human visual system is highly sensitive to frequencies of lower sensitivity. As used herein the term "perceptual dithering" refers to applying dithering in a perceptually uniform color space, such as ICtCp, so that the visibility of the dither noise is consistent across luminance levels. As was shown in Ref. [4], applying dithering using the BT.1886 representation causes the maximum error to be lower than one just-noticeable-difference (JND) at bright pixels but greater than 15 JND steps for dark pixels. By comparison, applying perceptual dithering using the BT.2100 $IC_TC_P$ representation provides stable performance across the luminance range from 0 to 10,000 cd/m². Without limitation, examples of other perceptually uniform color spaces include the IPT, CIELuv, CIELab, and HSLuv color spaces.

When implementing dithering, it may be desirable to reduce its visibility by attenuating spatial and temporal frequencies in the most sensitive regions of visual sensitivity. This practice is referred to as using blue or violet noise, which has a higher power spectrum in high spatial frequencies, as opposed to white noise which has a flat frequency distribution. Such techniques can be applied in addition to the ICtCp representation to further minimize the visibility of the dithering pattern. In an embodiment, without limitation, a static dither pattern with equal distribution across spatial frequencies (white noise) is employed. This is the simplest type of dither pattern, as it is applied to each pixel independently of the surrounding pixels—an advantage for some processors.

BT. 2100 specifies HDR system parameters using either perceptual quantization (PQ) or hybrid-log gamma (HLG). When using perceptual dithering as described herein, either PQ or HLG may be applied.

FIG. 1 depicts a perceptual dithering process according to an embodiment. Depending on processing power and real-time processing constraints, dithering may be applied only to the luminance component or all three color components. Given an input image (I), in step 105, assuming the input image is not in the proper color space, the image is converted to a perceptual uniform color space, such as the ICtCp color space, to generate image $I_P$. Pixel values in $I_P$ may also need to be rescaled to fit the desired range of the dithered output. In an embodiment, for an input bit depth ($B_I$) and a target bit depth ($B_T$), each pixel in the input bit depth is converted to a pixel in the target bit depth by dividing it by $2^{(B_I-B_T)}$. In practice, division by $2^{(B_I-B_T)}$ corresponds to a simple right-shift of the pixel values by $B_I-B_T$ bits.

Alternatively, in other embodiments, the following scaling may be applied:

$$Out_{B_T} = \left(\frac{ln_{B_I}}{2^{B_I}-1}\right)(2^{B_T}-1), \quad (1)$$

wherein $Out_{B_T}$ denotes the scaled output value given input $In_{B_I}$. Such pixel scaling may be performed before or after the color conversion, but before the next step.

Next, the $I_P$ image is quantized. For example, at pixel location (i,j), in an embodiment, the quantization step (110) may be expressed as $$I_{P-Q}(i,j)=\text{floor}(I_P(i,j)+0.5), \quad (2)$$

where, given real input x, floor(x) denotes the greatest integer less than or equal to x. The quantization step may be applied only to the luminance component or to all color components of the $I_P$ image.

Following quantization (110), step 115 computes an error image $$I_E(i,j)=I_P(i,j)-I_{P-Q}(i,j), \quad (3)$$

where each pixel in $I_E$ represents the pixel difference between corresponding pixels in the $I_P$ and $I_{P-Q}$ images.

In step 120, an output dithered image is generated using the quantized image, the error image, and a random threshold. For example, given a random threshold $T_h$ in [0,1], in an embodiment, pixels in the dithered image ($I_D$) may be computed as follows:

if $|I_E(i,j)|>T_h$ then $$I_D(i,j)=I_{P-Q}(i,j)+\text{sign}(I_E(i,j)),$$

else $I_D(i,j)=I_{P-Q}(i,j), \quad (4)$ where, given a real input x, $$\text{sign}(x) = \begin{cases} -1 & \text{if } x < 0 \\ 0 & \text{if } x = 0 \\ 1 & \text{if } x > 0 \end{cases}.$$

In an embodiment, $T_h$=rand( ), where rand( ) denotes a pseudo-random generation function, generating values uniformly distributed in [0, 1].

The proposed dithering method has the advantage that each pixel is calculated independently from its neighbors and from previous and subsequent frames, making it parallelizable and efficient to apply on a wide variety of processor architectures. For processors without an efficient, low-level, random number generator function, one alternative approach is to use a pre-computed small array of random numbers and then indexing into this array by a pseudo-random function of pixel position and time (Ref. [5]). The pre-computed array can also be filtered to remove spatial frequencies where the human visual system is the most sensitive.

Experimental results (Ref. [4]) demonstrated that the proposed method may achieve a 2-bit gain in visual performance when quantizing HDR images to 8-bit or 10-bit images. That is, it is possible to achieve the precision of a 10-bit source signal with only 8 bits, or the precision of a 12-bit source signal with only 10 bits.

Figure 2:
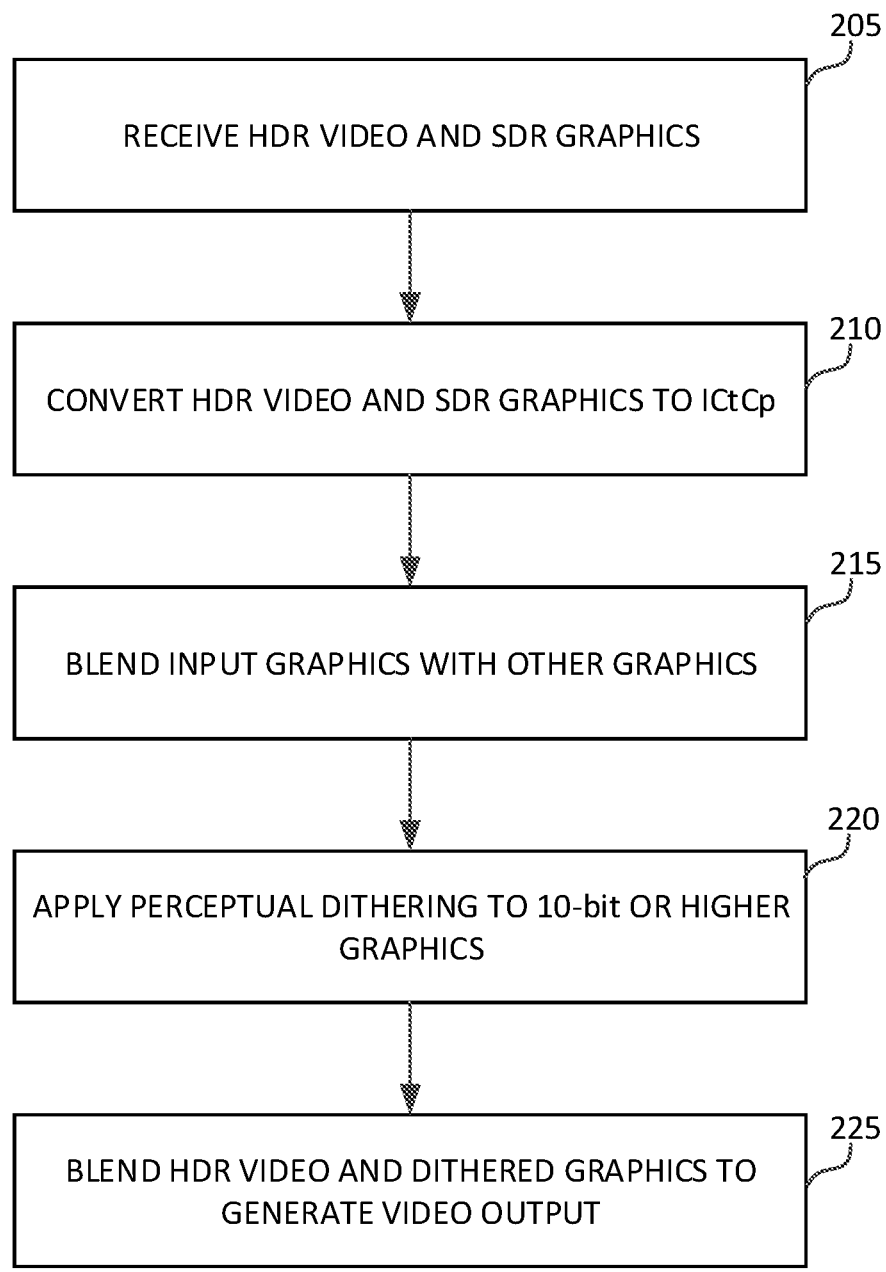
FIG. 2 depicts an example process of applying perceptual dithering in an HDR video processing pipeline according to an embodiment.

FIG. 2 depicts an example process of applying perceptual dithering in an HDR video processing pipeline according to an embodiment. As depicted in FIG. 2, in step 205, a display system may receive HDR video and SDR graphics. Graphics may include subtitles or other graphical information, such as logos, scores, banner advertisements, and the like. In step 210, all inputs may be translated to a perceptual uniform color space, such as ICtCp. If there are additional local graphics, such as menus and the like, in step 215, they may also be blended together with the input graphics, all in the ICtCp color space. In an embodiment, in step 220, as described earlier (e.g., see equations (2-4)), 10-bit or higher graphics may be perceptually dithered down to 8 bits to ensure good quality over an 8-bit interface. Finally, in step 225, using a display management process that may combine tone-mapping and blending (e.g., see Ref. [6]) the HDR video content and the combined SDR graphics are combined together according to the characteristics of the target display to be displayed on the target display.

REFERENCES

Each of these references is incorporated by reference in its entirety.
1. ST 2084:2014—Society of Motion Picture and Television Engineers (SMPTE) Standard—High dynamic range electro-optical transfer function of mastering reference displays, SMPTE, 2014.
2. Rec. ITU-R, BT.1886, "Reference electro-optical transfer function for flat panel displays used in HDTV studio production," 2011.
3. Rec. ITU-R, BT.2100, "Image parameter values for high dynamic range television for use in production and international programme exchange," 2018
4. R. Atkins, R. Wanat, and J. Pytlarz, "Perceptually dithered HDR for 8-bit interfaces," SMPTE 2020 Annual technical conference and Exhibition, November 2020.
5. S. Daly and X. Feng, "Decontouring: prevention and removal of false contour artifacts. Proceedings of the SPIE, Human Vision and Electronic Imaging IX," in *SPIE, Human Vision and Electronic Imaging IX*, 2004.
6. U.S. Pat. No. 9,584,786, "Graphics blending for high dynamic range video," by R. Atkins and E. L. Rivers.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to perceptual dithering for the coding of HDR video, such as those described herein. The computer and/or IC may compute, any of a variety of parameters or values that relate to perceptual dithering for the coding of HDR video as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for perceptual dithering for the coding of HDR video as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to perceptual dithering for the coding of HDR video are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for dithering image data, the method comprising:

by apparatus comprising one or more data processors configured by software, one or more programmable logic devices, one or more logic circuits or a combination thereof:

receiving an input image in a first color space and a first bit depth larger than 8 bits;

converting the input image into a first image ($I_P$) in a perceptually uniform color space with pixel values scaled to be within a target bit depth;

quantizing the first image to generate a quantized image ($I_{P-Q}$), wherein at pixel location (i,j)

$$I_{P-Q}(i,j)=\text{floor}(I_P(i,j)+0.5);$$

generating an error image ($I_E$) comprising pixel by pixel differences between pixels in the first image and corresponding pixels in the quantized image;

generating a random threshold ($T_h$) in [0, 1]; and generating a dithered image ($I_D$) based on the random threshold, the error image, and the quantized image, wherein if $|I_E(i,j)|>T_h$ then $$I_D(i,j)=I_{P-Q}(i,j)+\text{sign}(I_E(i,j)),$$

else $I_D(i,j)=I_{P-Q}(i,j)$.

2. The method of claim 1, wherein the perceptually uniform color space comprises the ICtCp color space.

3. The method of claim 1, wherein given the first bit depth ($B_I$) and the target bit depth ($B_T$), each pixel in the first bit depth is scaled to a pixel in the target bit depth by dividing it by $2^{(B_I-B_T)}$, wherein $B_I>B_T$.

4. The method of claim 1, wherein the target bit depth is 8 bits.

5. The method of claim 1 wherein the random threshold values are generated by a pseudo-random generation function with a uniform distribution in [0, 1].

6. The method of claim 1, wherein the random threshold values are generated by indexing into an array of precomputed random values, wherein the indexing is generated as a function of pixel position in space and time.

7. A non-transitory computer-readable storage medium having stored thereon computer-executable instructions for executing with one or more processors a method in accordance with claim 1.

8. An apparatus comprising a processor and configured to perform the method recited in claim 1.

9. A method for dithering image data, the method comprising:

by apparatus comprising one or more data processors configured by software, one or more programmable logic devices, one or more logic circuits or a combination thereof:

receiving an input image in a perceptually uniform color space and a first bit depth larger than 8 bits;

scaling pixel values in the input image to generate a first image ($I_P$) in the perceptually uniform color space and with pixel values within a target bit depth;

quantizing the first image to generate a quantized image ($I_{P-Q}$), wherein at pixel location (i,j)

$$I_{P-Q}(i,j)=\text{floor}(I_P(i,j)+0.5);$$

generating an error image ($I_E$) comprising pixel by pixel differences between pixels in the first image and corresponding pixels in the quantized image;

generating a random threshold ($T_h$) in [0, 1]; and generating a dithered image ($I_D$) based on the random threshold, the error image, and the quantized image, wherein if $|I_E(i,j)|>T_h$ then $$I_D(i,j)=I_{P-Q}(i,j)+\text{sign}(I_E(i,j)),$$

else $I_D(i,j)=I_{P-Q}(i,j)$.

* * * * *